United States Patent
Hērvé et al.

(10) Patent No.: US 6,330,938 B1
(45) Date of Patent: Dec. 18, 2001

(54) METHOD AND DEVICE FOR CONTROLLING AN ELECTRIC ACTUATOR ACTIVATING A FUNCTIONAL SYSTEM

(75) Inventors: Perrault Hērvé, Paris; Goly Fabrice, Eragny/Oise, both of (FR)

(73) Assignees: Automobile, Peugeot, Paris; Automobiles Citroen, Neuilly, both of (FR)

( * ) Notice: Subject to any disclaimer, the term of this patent is extended or adjusted under 35 U.S.C. 154(b) by 0 days.

(21) Appl. No.: 09/485,226

(22) PCT Filed: Jun. 15, 1999

(86) PCT No.: PCT/FR99/01430

§ 371 Date: Mar. 29, 2000

§ 102(e) Date: Mar. 29, 2000

(87) PCT Pub. No.: WO99/65744

PCT Pub. Date: Dec. 23, 1999

(30) Foreign Application Priority Data

Jun. 15, 1998 (FR) .................................................. 98 07524

(51) Int. Cl.[7] .................................................. B60L 7/00
(52) U.S. Cl. ........................................... 188/158; 188/156
(58) Field of Search ..................................... 188/156, 158

(56) References Cited

U.S. PATENT DOCUMENTS 3,638,766 * 2/1972 Besoyan ........................... 188/156 X
4,520,907 * 6/1985 Sikora ................................... 188/156
5,270,932   12/1993 Yoshizawa et al. .
5,769,189 * 6/1998 Heibel et al. ......................... 188/156
6,139,117 * 10/2000 Shiria et al. ..................... 188/158 X

FOREIGN PATENT DOCUMENTS

| 41 29 919 A1 | 3/1993 | (DE) | ............................... B60T/13/74 |
| 42 18 717 A1 | 12/1993 | (DE) | ................................ B60T/7/12 |
| 0 263 912 A1 | 4/1988 | (EP) | ................................ G05D/3/10 |

* cited by examiner

*Primary Examiner*—Joseph D. Pape
*Assistant Examiner*—Lori L Coletta
(74) *Attorney, Agent, or Firm*—Connolly Bove Lodge & Hutz LLP

(57) ABSTRACT

This device comprising a control member (2) actuatable by a user so as to govern the powering of the actuator, is characterized in that it comprises means (10) for estimating the movements of the control member (2), along a travel thereof between extreme positions of control of the actuator, and means (12, 13, 14, 15, 16) for analysing these movements so as to derive therefrom a cue for controlling means (17) for powering the actuator so as to supply the latter with a quantity of current corresponding to the movement of the control member, as determined by these means of analysis on the basis of a predetermined correspondence law (15) stored in the latter means and of means (16) for aggregating the successive movements of the actuator during its various controls, and updated after each new control of the actuator by these means of analysis, so as to slave the position of the actuator to the position of the control member.

9 Claims, 3 Drawing Sheets

METHOD AND DEVICE FOR CONTROLLING AN ELECTRIC ACTUATOR ACTIVATING A FUNCTIONAL SYSTEM

FIELD OF THE INVENTION

The present invention relates to a process and device for controlling an electric actuator for activating a functional system, comprising a control member actuatable by a user so as to govern the powering of the actuator.

BACKGROUND OF THE INVENTION

Such a functional system can be constituted by an automotive vehicle secondary brake.

Secondary brake devices, that is to say parking brake devices, are known wherein activation is effected by electric actuators whose operation is governed by a user by way of a control member making it possible to drive the powering of the actuator.

The control member is constituted in such devices in particular by a switch making it possible to power or otherwise the actuator, that is to say in fact to bring about complete application or release of the secondary brake of the vehicle.

Systems of this type also comprise electronic means for managing the powering of the actuator as a function of cues emanating from sensors for example sensing the rate of rotation of the wheels of the vehicle, such as those used in wheel anti-lock systems.

However, such means have a number of drawbacks, especially as regards their cost, their operation and their manipulation by a user.

Indeed, one is aware that managing the holding of a vehicle stationary on a slope is relatively simple to manage with such an interface, by for example powering the actuator under full voltage.

However, the cue delivered to the device by the user via such an interface, is of the all or nothing type, whereas by using a traditional brake lever for tensioning the cables for applying the secondary brake, the user manages the tension of the cable and its rate of tensioning and regulates the latter as a function of the deceleration of the vehicle.

It is appreciated that for various reasons it is desirable to preserve such functional capabilities.

The objective of the invention is therefore to solve these problems at minimum cost.

To this end, the subject of the invention is a process for controlling an electric actuator for activating a functional system, especially an automotive vehicle secondary brake, of the type comprising a control member actuatable by a user so as to govern the powering of the actuator, characterized in that it comprises the following steps:

a) the movements of the control member are estimated, in terms of direction and amplitude, along a travel thereof between extreme positions of control of the actuator, and b) these movements are analysed so as to derive therefrom a cue for controlling means for powering the actuator so as to supply the latter a quantity of current corresponding to the movement of the control member, as determined on the basis of a predetermined correspondence law and of means for aggregating the successive movements of the actuator during its various controls, and updated after each new control thereof, so as to slave the position of the actuator to the position of the control member.

According to another aspect, the subject of the invention is also a device for controlling an electric actuator for activating a functional system, especially an automotive vehicle secondary brake, of the type comprising a control member actuatable by a user so as to govern the powering of the actuator, characterized in that it comprises:

a) means for estimating the movements of the control member, in terms of direction and amplitude, along a travel thereof between extreme positions of control of the actuator, and b) means for analysing these movements so as to derive therefrom a cue for controlling means for powering the actuator so as to supply the latter with a quantity of current corresponding to the movement of the control member, as determined by these means of analysis on the basis of a predetermined correspondence law stored in the latter means and of means for aggregating the successive movements of the actuator during its various controls, and updated after each new control of the actuator by these means of analysis, so as to slave the position of the actuator to the position of the control member.

The invention will be better understood with the aid of the description which follows, given merely by way of example while referring to the appended drawings in which:

DETAILED DESCRIPTION

Figure 1:
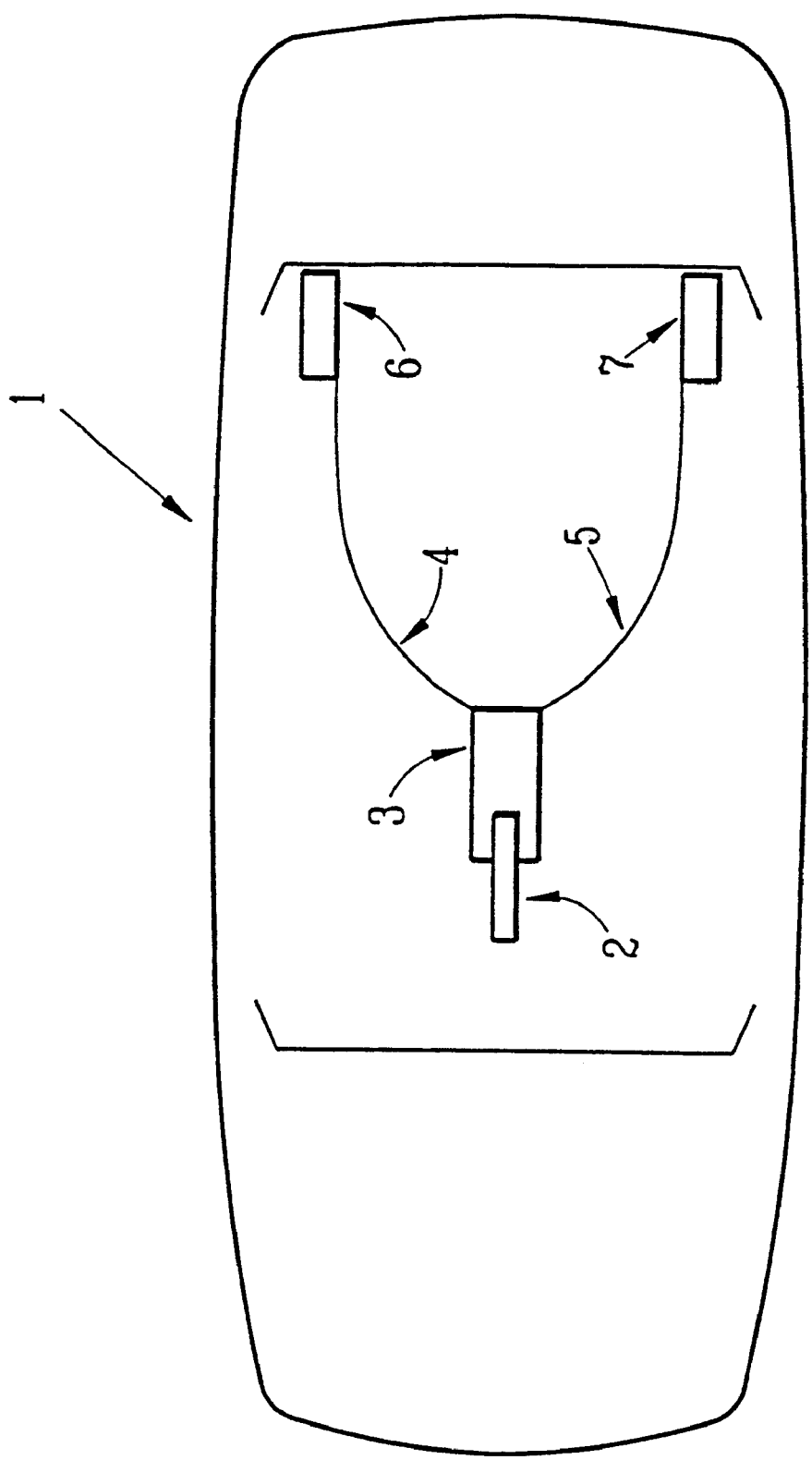
FIG. 1 represents a schematic diagram illustrating the installation of a device for controlling an electric actuator for activating a functional system such as an automotive vehicle secondary brake.

Represented in fact in FIG. 1 is an automotive vehicle designated by the general reference 1, which is equipped with a functional system such as a secondary brake also known in the state of the art as a parking brake.

This functional system comprises a control member actuatable by a user, designated by the general reference 2 and comprising for example a lever.

This lever is associated with an electric actuator designated by the general reference 3, making it possible to control the tensioning of cables, for example 4 and 5, for tensioning the callipers 6 and 7 for braking the rear wheels of the vehicle.

In fact, the electric actuator 3 can comprise an electric motor associated with means for winding/unwinding the cables for actuating the secondary brake of the vehicle.

In a desire to economize with regard to such an actuator, the electric motor is preferably an electric motor of the direct current type.

In the process and the device according to the invention, one focuses on not losing the functional capabilities of an automotive vehicle conventional secondary brake, by proposing an interface equivalent to that currently installed in the vehicles, that is to say which allows the user to control the tension of the cable and its rate of tensioning and to regulate this tension as a function of the deceleration of the vehicle, by carrying out a correlation between the position of the control member 2 and the tension of the cables.

In this case, the tension of the cables is regulated by the user by slaving the position of this member to the deceleration of the vehicle as experienced by this user.

To achieve such a mechanism, the simplest and most economical solution consists in carrying out slaving between the tension of the cables and a control member position cue output by a sensor associated with the member.

However, this involves the use of sensors of the load on the cables, this being a relatively expensive technology.

Now, the price criterion is an important criterion and this slaving must therefore be achievable without any cable tension sensor.

Therefore the control process and device according to the invention use means for powering the actuator with quantities of current calculated as a function of the movements of the lever or control member 2.

To this end, in the control process according to the invention, the movements of the control member 2 are estimated, in terms of direction and amplitude, along a travel thereof between extreme positions of control of the actuator 3, and these movements are analysed so as to derive therefrom a cue for controlling means for powering the actuator so as to supply to the latter a quantity of current corresponding to the movement of the control member. This quantity of current $T_p$ is determined on the basis of a predetermined correspondence law and of means for aggregating the successive movements X of the actuator during these various controls, and updated after each new control thereof, so as to slave the position of the actuator to the position of the control member.

Thus, a law dependent on the mechanical and electrical characteristics of the system and of the vehicle is established between the movements of the control member 2 and a quantity of current $T_p$ to be supplied to the actuator so as to slave the position of this actuator to the position of the control member.

With such a system operating in open loop, it may be subject to drifting.

The latter is then compensated for by a gauging of the control for powering the actuator with each passage to the extreme position of the travel of the control member.

The inertia of the functional system as well as its frictional characteristics are taken into account by filtering the power supplied to the actuator.

This filtering dispenses with the despatching of a quantity of current to the actuator when this quantity is below a predetermined threshold, that is to say is too small to "shift" or activate the motor, but stores and numerically aggregates what has been filtered so as to despatch it to the actuator when the quantity of current is sufficient to activate the motor.

It is then appreciated that in the case where the actuator comprises an electric motor associated with means for winding/unwinding a cable for actuating the functional system, the governing strategy described earlier makes it possible to estimate the winding/unwinding of the cable via a decomposition of the quantities of current for controlling this motor.

Indeed, in order to govern the motor, it is appropriate to calculate the quantity of current to be supplied to the motor so as to obtain winding/unwinding of the cables corresponding to the movement of the control member.

The quantities of current supplied successively to the actuator during these various controls are then stored in aggregation means which are updated after each new control of the actuator, their content being the image of the state of winding/unwinding of the cables.

The factor making it possible to convert the movements of the control member into a quantity of current supplied to the motor is interpolated as a function of the content of these means of aggregation.

Figure 2:
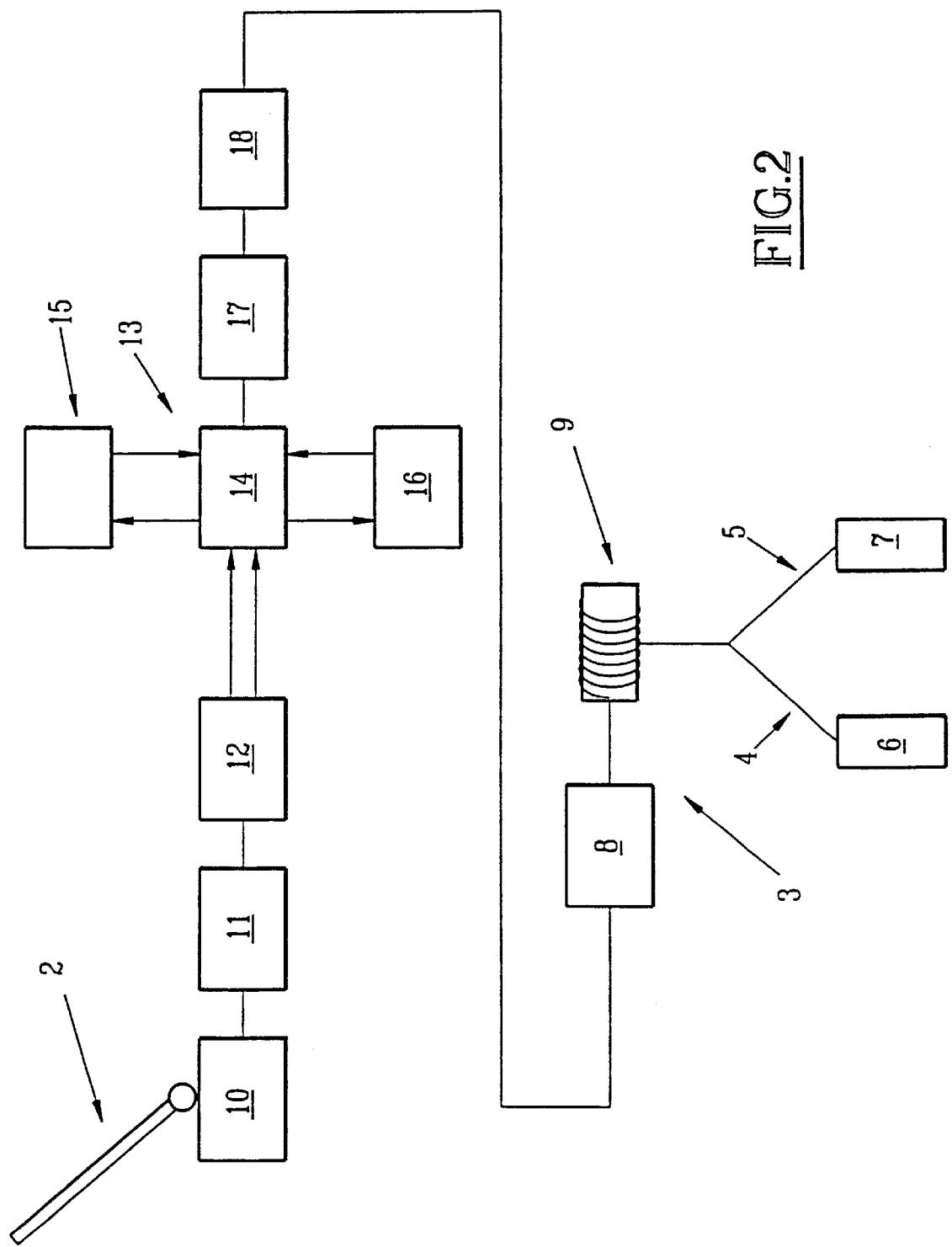
FIG. 2 represents a schematic diagram illustrating the structure and the operation of such a device.

An exemplary embodiment of a device for implementing this process is described in FIG. 2.

Depicted in fact in this figure are the control member designated by the general reference 2 and the electric actuator 3 for activating the functional system, this electric actuator comprising for example an electric motor 8 associated with means for winding/unwinding at least one cable for actuating the functional system, these means being designated by the general reference 9, whilst the cables are designated by the general references 4 and 5 and the callipers associated with the rear wheels of the vehicle by the references 6 and 7.

The control member 2, that is to say in fact for example the lever, is associated with a position sensor of conventional type designated by the general reference in this figure, the output of which is associated with gauging means designated by the general reference 11, making it possible to compensate for the drifting of the system by gauging the control for powering the actuator with each passage to the extreme position of the travel of the control member.

Indeed, if the control member is in the position of complete release, the means for powering the actuator are reset to zero, whereas if the control member is in the position of maximum application, the means for powering the actuator supply the latter with maximum power.

The output of these gauging means is supplied to means for estimating the movements of the control member 2, in terms of direction and amplitude, along the travel thereof between its extreme positions, these means of estimation being designated by the general reference 12 in this figure.

These means of estimation make it possible to deliver to the remainder of the circuit, cues relating to the direction and amplitude of movement of the control member.

These cues are then analysed by a cues processing unit designated by the general reference 13, comprising for example a calculation unit designated by the general reference 14 associated with data storage means designated by the general references 15 and 16 in this FIGURE.

The storage means 15 are for example suitable for storing the predetermined correspondence law, such as described earlier, whilst the storage means 16 are suitable for storing the quantities of current supplied successively to the actuator during its various controls, these means being updated after each new control thereof by the calculation unit 14.

The correspondence law mentioned earlier and the means of aggregation then allow the calculation means 14 to determine a cue for controlling means 17 for powering the actuator, so as to supply the latter with quantities of current in respect of the movements of the actuator and whose number is determined on the basis of this predetermined correspondence law and of these means of aggregation as was described earlier.

Finally, it will also be noted that this device comprises means 18 of diagnosis of its operation.

These means are for example based on a comparison of the calculated powering of the actuator, of the type: calculated motor current rating=measured battery voltage/resistance of the motor and of its effective powering, that is to say the measured motor current rating.

It goes without saying of course that other means of diagnosis may be envisaged.

It is then appreciated that by virtue of such a structure, it is possible to use a control member which can be moved along a travel between extreme positions of control of the actuator and that the movements of this control member are analysed, in terms of direction and amplitude, so as to acquire cues from the user relating to the governing of the actuator.

These cues relating to the movement of the control member are thereafter analysed so as to determine a cue for controlling the means for powering the actuator so as to supply the latter with a quantity of current which depends on the estimated movement of the control member.

This determination is carried out by a unit for processing cues on the basis of a predetermined correspondence law taking into account the various characteristics of the functional system needing to be governed and of the means for aggregating the quantities of current supplied successively to the actuator during these various controls, these means of aggregation being updated after each new control of the actuator.

Figure 3:
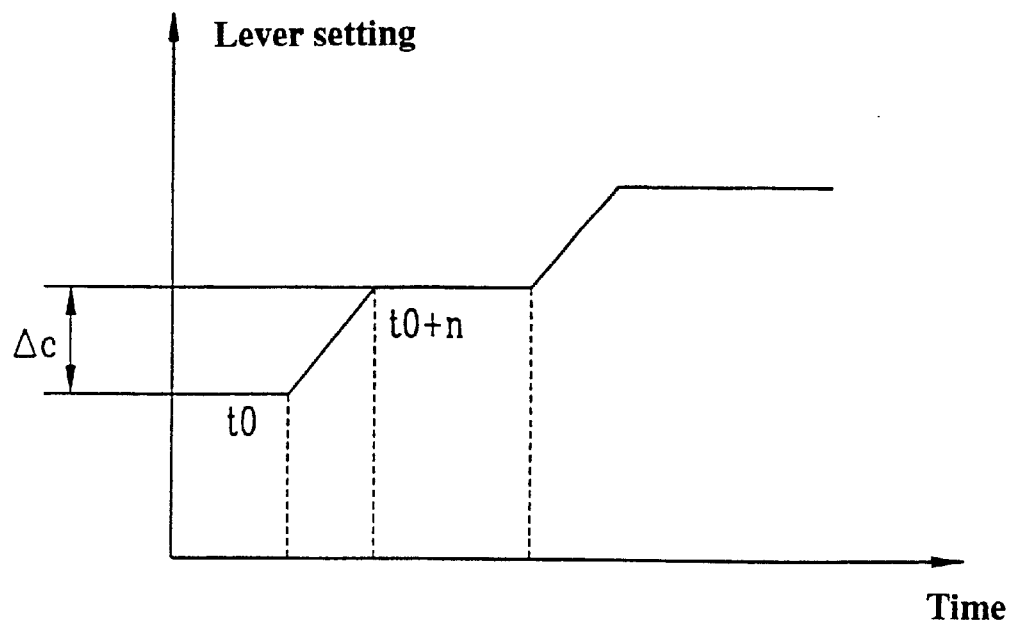
FIGS. 3 and 4 represent graphs illustrating the determination of the quantity of current.
Figure 4:
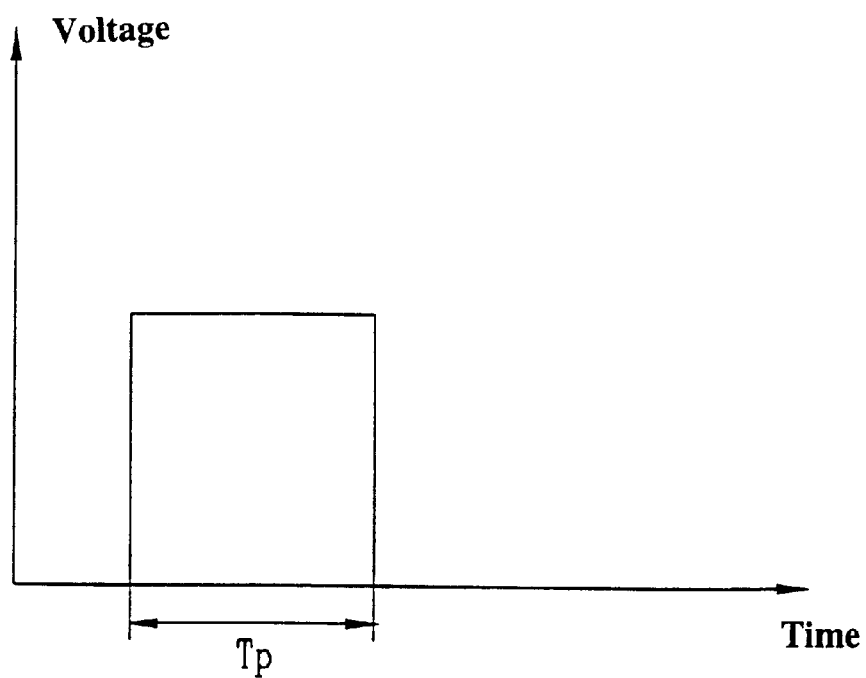

The determination of this quantity of current is represented in FIGS. 3 and 4 which show graphs respectively illustrating the setting of the control member 2 and the quantity of current necessary $T_p$.

The law of correspondence between these two values is of the type:

$$T_p = \Delta c \times \text{Coeff } k;$$

where: $T_p$=quantity of current;
$\Delta c$=variation of the position of the lever;
Coeff k=nonlinear variable coefficient making it possible to compensate for the nonlinearity of the winding, dependent on the movements X of the actuator.

It is understood that this quantity of current $T_p$ makes it possible to move the cable, that is to say to wind it or unwind it by a value X, the latter corresponding to:

$$X = T_p / T \text{ elementary;}$$

where T elementary=elementary quantity of current.

The means for aggregating the estimated movements advantageously make it possible to determine the quantity of current necessary $T_p$, these means interfering directly on the value of the coefficient k.

This determination makes it possible to take into account the state of winding of the cable, since much more energy and hence a greater quantity of current is required to wind the cable if the latter is already mostly wound.

This then makes it possible to slave the position of the actuator to the position of the control member.

Of course, other means such as for example other forms of control member may be envisaged.

The actuator, that is to say for example the electric motor and the means for winding/unwinding the cables, as well as the various electronic means associated with the governing thereof may be mounted together in a common block supporting the control lever.

Of course, the load experienced by the user when maneuvering this member may be either linear or modulated by means of variable braking of its movement along its travel, these means comprising for example a cam or any other mechanical, electrical or hydraulic member making it possible to vary the load to be applied by the user to this lever as a function of its position along its travel.

What is claimed is:

1. Process for controlling an electric actuator comprising:
    a control member actuatable by a user so as to govern the powering of the actuator, the process comprising the following steps:
    a) the movements of the control member are estimated, in terms of direction and amplitude, along a travel thereof between extreme positions of control of the actuator, control for powering the actuator is gauged with each passage to the extreme position of the travel of the control member,
    b) these movements are analyzed so as to derive therefrom a cue for controlling means for powering the actuator so as to supply to the latter a quantity of current corresponding to the movement of the control member, as determined on the basis of a predetermined correspondence law and of means for aggregating the successive movements of the actuator during its various controls, and updated after each new control thereof, so as to slave the position of the actuator to the position of the control member.

2. Process according to claim 1, wherein the quantities of current which are below a predetermined threshold are filtered and these are aggregated so as to feed them back to the actuator when this aggregate is sufficient to activate the actuator.

3. Device for controlling an electric actuator for activating a functional system, especially an automotive vehicle secondary brake, having a control member actuatable by a user so as to govern the powering of the actuator, the device comprising:
    a) means for estimating the movements of the control member, in terms of direction and amplitude, along a travel thereof between extreme positions of control of the actuator, and
    b) means for analyzing these movements so as to derive therefrom a cue for controlling means for powering the actuator so as to supply the latter with a quantity of current corresponding to the movement of the control member, as determined by these means of analysis on the basis of a predetermined correspondence law stored in the latter means and of means for aggregating the successive movements of the actuator during its various controls, and updated after each new control of the actuator by these means of analysis, so as to slave the position of the actuator to the position of the control member; and
    means for gauging the means for controlling the powering of the actuator with each passage to the extreme position of the travel of the control member.

4. Device according to claim 3, further comprising means for filtering the quantities of current which are below a predetermined threshold and means for aggregating these quantities so as to feed them back to the actuator when this aggregate is sufficient to activate the actuator.

5. Device according to claim 3, wherein the control member further comprises a lever.

6. Device according to claim 5, wherein the means for estimating the movements of the control member comprise a lever position sensor.

7. Device according to claim 3, wherein the control member is associated with means of variable braking of its movement along its travel.

8. Device according to claim 7, further comprising means of diagnosis of its operation.

9. Device according to claim 3, wherein the actuator further comprises an electric motor associated with means for winding/unwinding at least one cable for actuating the functional system.

* * * * *